J. M. COLEMAN.
CAR DUMPING MECHANISM.
APPLICATION FILED JUNE 30, 1910.

998,326.

Patented July 18, 1911.

WITNESSES

INVENTOR
JAMES M. COLEMAN.

UNITED STATES PATENT OFFICE.

JAMES M. COLEMAN, OF MONTREAL, QUEBEC, CANADA.

CAR-DUMPING MECHANISM.

998,326.  Specification of Letters Patent.  Patented July 18, 1911.

Application filed June 30, 1910. Serial No. 569,665.

*To all whom it may concern:*

Be it known that I, JAMES M. COLEMAN, of the city of Montreal, in the Province of Quebec and Dominion of Canada, have invented certain new and useful Improvements in Car-Dumping Mechanism, of which the following is a full, clear, and exact description.

This invention relates to improvements in convertible cars, and the object is to provide a car which may be used in one form as a flat floored car for carrying miscellaneous freight, and may be quickly and easily converted into a hopper bottom car for carrying grain, coal or the like.

A further object is to provide a hopper bottom car which may be quickly and easily dumped into a small area, such as the chutes of a grain elevator.

A still further object is to provide means for preventing leakage of grain from the car during transit.

To accomplish these objects, I provide a car having the floor thereof formed in sections, covering permanent hoppers. When the car is used as a general purpose freight car, the floor remains level but when used as a grain or coal car, the floor sections over the hoppers are raised to form the car into a hopper bottom car. The floor comprises two central sections divided longitudinally of the car and adapted to be raised at the sides to cover the doorways. An intermediate section at each end of the central sections is adapted to be raised at the ends of the car to form continuations of the hopper bottoms, and a stationary section at each end of the car over the trucks. A suitable jamb plate is provided at the mouth of each hopper. A slidable door is arranged to open or close the hopper mouth and is adapted to overlap the jamb plate so as to prevent any grain leakage during transit.

Figure 1:
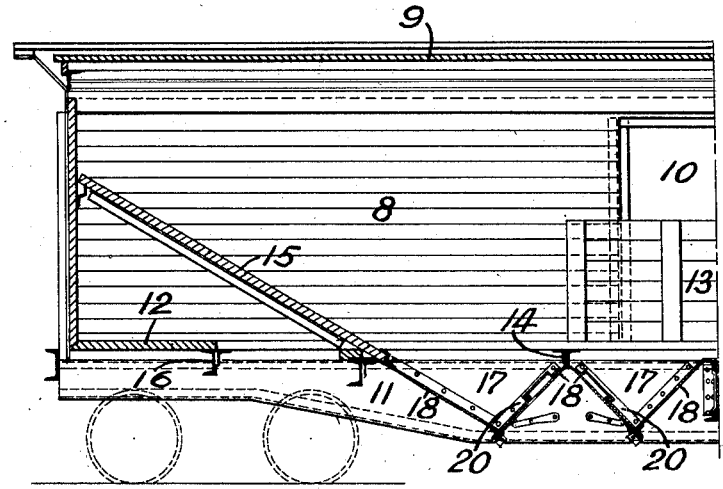
Figure 2:
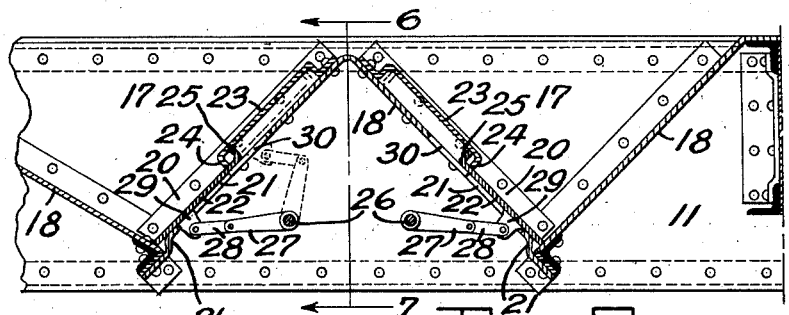
Figure 3:
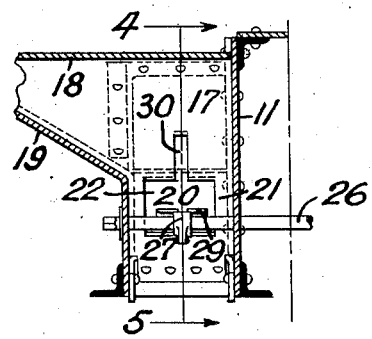

In the drawings which illustrate my invention:—Figure 1 is a half vertical longitudinal section of a car equipped with my gate. Fig. 2 is an enlarged view on the line 4—5 of Fig. 3, showing the gate in detail. Fig. 3 is a fragmentary vertical cross section on the line 6—7 of Fig. 2.

In the above defined figures, 8 designates the box or body of a car which is preferably made with the boards placed longitudinally inside the framework so as to present a perfectly smooth interior surface. This body is provided with a roof 9 and doorways 10. The body is mounted on longitudinal center sills 11. At each end of the car, the portion 12 of floor over the truck is stationary. The floor in the center of the car is formed of a pair of doors 13 which divide longitudinally at the center and are hinged at the sides of the car. These doors 13 extend well beyond the sides of the doorways and are supported at their ends on the transverse cross bearers 14. The floor at each end of the doors 13, between said doors and the stationary floors 12, is formed in a single intermediate section 15 extending the full width of the car. These intermediate sections 15 are supported at their inner ends on the same cross bearer 14 which supports the ends of the doors, and are supported at their outer ends on other transoms 16, which latter transoms also support the inner ends of the stationary floor sections 12. Below the floor a plurality of stationary hoppers 17 are located on each side of the center sills. These hoppers are composed of plates 18 sloping downwardly between the transoms. The inner sides of the hoppers are formed by the webs of the center sills, and the outer sides are formed by plates 19 sloping downwardly from the sides of the car toward the center sills. At the bottom of each pair of hoppers, the adjacent plates 18 forming the same are apertured at 20 to form the mouth of the hopper. The mouth 20 of the hopper is preferably rectangular as shown, and is provided on three sides with a jamb 21, the plate 18 forming the jamb on the fourth side. A sliding door or cover 22 is provided for the mouth. This door 22 is located within the hopper so that the weight of the load will hold it tightly against the jamb. A plate or housing 23 is fixed to the end plate 18 of the hopper above the door 22, and is spaced from the plate 18 so as to provide a recess for the reception of the door 22 when opened. The lower edge 24 of the housing 23 is turned downwardly toward the plate 18, and the upper edge 25 of the door is turned upwardly within the recess, so as to form a lock to prevent the removal of the door 22. A shaft 26 is located transversely of the car and is provided with a lever 27 fixed thereto. A link 28 is pivoted at one end to the free extremity of the lever, and at the other end to a bracket 29 fixed to the door 22, near the lower edge thereof. A slot 30 is provided in the plate 18 to allow the passage of the bracket 29 when the door opens. The ends of the shaft 26 may be squared to receive a suitable operating lever or wheel.

In operation as a grain car, the two floor doors 13 are raised to form an inner covering for the doorways 10, and the intermediate floor sections 15 are disposed as shown in Fig. 1, so that there is no level floor on which the grain will lodge. The car is filled in the usual way and despatched to its destination. To empty the car, the operator rotates the shaft 26 to shift the lever 27 and raise the doors on each side of the center sill to the position shown in dotted lines in Fig. 2. When the car is empty or sufficient grain has escaped, the shaft 26 is rotated in the reverse direction so that the door returns to its original position. It will be readily seen from Fig. 2, that the door in closing will slide over the jamb, thus displacing any grain that would tend to obstruct the closing or block the door open sufficiently to allow grain to leak out. It will also be seen that whether in opening or closing, the door moves edgewise through the grain so that practically no resistance is offered to the movement.

The doors may, obviously, be operated in any combination desired, and by any suitable mechanism other than that disclosed without departing from the spirit of the invention.

Having thus described my invention, what I claim is:—

1. In a car of the class described, a plurality of hoppers each comprising bottom, end and side plates, and having a mouth in the end thereof, a jamb plate surrounding the mouth, a sliding door within the hopper adapted to be held against the jamb plate by the load in the hopper, a housing for said door, a transverse shaft, a lever thereon, and a link connecting the lever and door.

2. In a car of the class described, the combination with the center sill of the car of hopper bottom and end plates fixed to each side of the center sill, sloping side plates for the hoppers extending between the sides of the car and the hopper bottom and end plates, sliding doors in said hopper end plates, door housings within the hoppers, a shaft extending transversely under the car, levers fixed thereto, and links connecting the levers to the hopper doors.

3. In a car of the class described, a plurality of hoppers on each side of the center sill, doors slidably mounted within the adjacent ends of said hoppers having flanged upper edges, housings for said doors having flanged lower edges, a transverse shaft, levers thereon, and links connecting the levers and doors.

In witness whereof I have hereunto set my hand in the presence of two witnesses.

JAMES M. COLEMAN.

Witnesses:
STUART R. W. ALLEN,
E. R. McKENZIE.

---

Copies of this patent may be obtained for five cents each, by addressing the "Commissioner of Patents, Washington, D. C."